May 17, 1927.
M. C. MYERS
1,629,356
HARROW
Filed Sept. 20, 1926
2 Sheets-Sheet 2
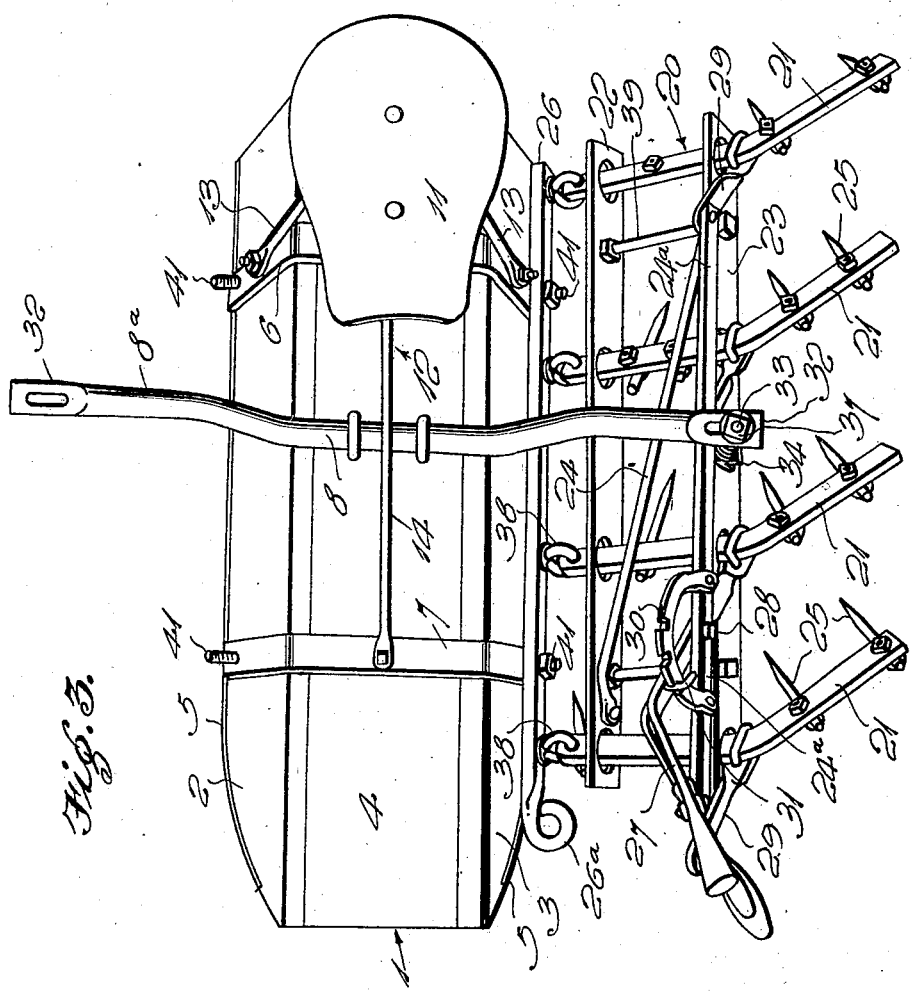
Witness
T. H. Woodard
Inventor
M. C. Myers,
By H. B. Wilson Yeo
Attorneys Patented May 17, 1927.

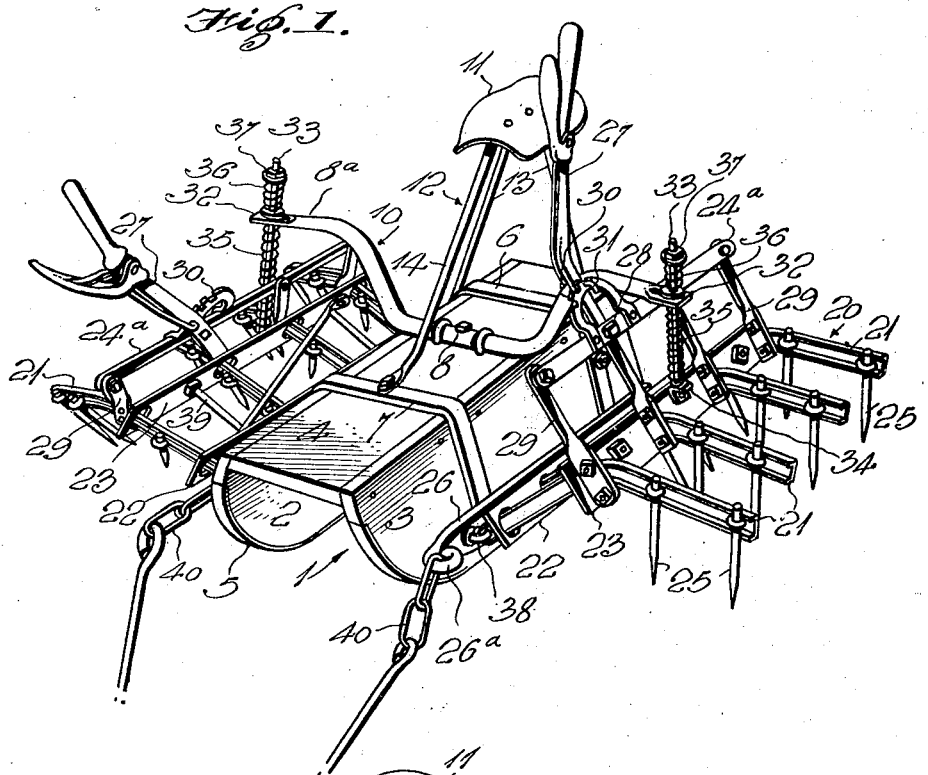

1,629,356

UNITED STATES PATENT OFFICE.

MILTON C. MYERS, OF ST. JOSEPH, MISSOURI.

HARROW.

Application filed September 20, 1926. Serial No. 136,561.

This invention relates to farm implements and more particularly to harrows of the sled type for use in cultivating small corn, cotton or other crops planted in furrows such as those made by a lister.

In this connection the invention recognizes that in the construction of an implement to accomplish this function of cultivating small plants which have been planted in furrows, until the ridges are nearly leveled down or until the crop is too tall to pass under the sled, it is desirable to construct a machine with wings which may be raised or lowered according to the shape of the ridges.

To accomplish such cultivation the invention has in view the construction of a harrow the teeth of which are arranged to mash all of the clods and to so work up all of the fresh fine earth to the plants that they will stand without being covered up.

With this harrow construction in view one of the primary objects of the invention is to provide novel means of constructing and mounting wings to adapt them to mash all clods and kill all grass and weeds and to work the top of the ridge down to where the crop is being cultivated.

Another object is to so construct the harrow that it will be strong yet light and each of which is complete in itself ready for use.

In carrying out these objects, the invention is susceptible of a wide range of modification without departing from the spirit or sacrificing any of the advantages of the claimed invention, there being shown in the drawings for illustrative purposes a preferred and practical form in which Figure 1 represents a perspective view of a cultivator constructed in accordance with this invention with one wing in lowered operative position and the other lifted.

Fig. 2 is a transverse section thereof; and

Fig. 3 is a perspective view taken from the top showing one wing omitted.

Like reference characters designate corresponding parts throughout the several figures of the drawings.

This invention contemplates in the construction of such a harrow for use in cultivating crops planted in furrows, the provision of a central sled member designated generally as 1 and adjustable wings 10 and 20 located on opposite sides of the sled member 1.

The sled 1 is constructed of any suitable material preferably of cypress lumber and the runners 2 and 3 which are bolted to the side edges of the top 4 of the sled diverge toward their lower edges being rounded at their front ends and preferably equipped on their earth-engaging edges with iron wear tires or plates 5. These runners 2 and 3 are designed to travel in the bottom of the lister ditch which holds the cultivator or harrow in position on the row.

Iron braces 6 and 7 extend transversely across the sled at longitudinally spaced intervals and are bolted or otherwise suitably secured to the sled. A seat 11 is suitably supported on the sled, iron rods 12 being here shown for this purpose two of which extend down over the sides of the runner at the rear of the sled as shown at 13 while the front rod 14 extends forwardly and is bolted to the brace 7.

The harrow wings 10 and 20 which are located one on each side of the sled are constructed exactly alike, hence one only will be described in detail. Each of these wings is constructed of a plurality of obtuse-angled crossbars 21 four of which are here shown and three longitudinal bars 22, 23 and 24. As shown each transverse bar 21 is equipped with four teeth, those on one bar being arranged in staggered relation with those on the others. Each crossbar 21 is connected with a draw bar 26 secured to the lower edge of its adjacent wing. These crossbars have swiveled connection with the draw bar and said bars 21 pass loosely through the longitudinal bars 22 and 23 which permits the bar 21 to move freely.

The obtuse-angled crossbars 21 are shaped to fit the ridges in connection with which the implement is to be used and all of the crossbars, longitudinal bars and braces are made of iron which provides the necessary weight for the harrow to mash the clods. The teeth 25 carried by the bars 21 are set straight up and down and may be tilted to any position desired from flat down to straight up, and held in any desired position by a ratchet lever 27 fulcrumed at 28 on a longitudinally extending bar 24ª which carries pivotally connected depending bars or links 29 rigidly attached to their lower ends to the crossbars 21. A rack 30 is carried by the bar 24ª and the ratchet 31 of the lever 27 is designed to be engaged therewith for locking said lever in adjusted position whereby the teeth 25 are held in upright position as shown at the right of Fig. 1 or in inclined position as shown at the left of said figure.

A bar 8 is fixedly secured to the top 4 of the sled and extends transversely thereof having its end 8ª off-set or arched upwardly and provided with flattened longitudinally slotted terminals 32 through which pass bolts 33 which also pass through brackets 34 carried by the bar 23. This arched bar 8 is designed to hold the wings 10 and 20 down in operative position and the bolts 33 have mounted thereon coiled springs 35 and 36, the springs 35 being larger than those 36 and normally disposed below the ends of the bar 8 while the smaller springs are located above the bar between the upper face thereof and a burr 37. These springs are arranged as above described with the longer spring below the bar 8 and the shorter above when the ridges which are being cultivated are high and after the ridges have been worked down both springs are disposed below the bar as shown in Fig. 2. It is of course understood that by using the shorter spring above the bar it operates to raise the wing while the arrangement of both springs below the bar tends to lower the wing.

As shown the tooth-carrying crossbars 21 are each secured to the draw bar 26 by an eye bolt 38 the straight end of the bolt extending through the draw bar and being housed in said bar which is constructed of channel iron and the burr or nut is located within the hollow of the bar 26. There is a slight play between the shoulder of the eye bolt and its burr to allow the bolt to turn to permit tilting of the bars 21. The loop of a bolt extends loosely through the end of each bar to provide for the wing being free to swing up or down in the manner of a hinge.

The longitudinally extending crossbar supports 22 and 23 have elongated openings to permit free passage of said crossbars therethrough and permit them to swing or tilt readily within said apertures. These bars 22 and 23 are held in spaced relation by spacing bolts or rods 39 and are further braced by a rod or bar 24 which extends from one corner to the other of the wing as is shown clearly in Figs. 1 and 3.

A suitable hitch may be connected with the draw bars 26 by means of links 40 engaged with the eyes 26ª formed at the front ends of said bars as is shown clearly in Fig. 1.

Each wing is preferably made about two inches higher in the front than in the rear and is securely fastened to the sled by two bolts 41 passing through the draw bar and also through the ends of the braces 6 and 7 and the runners 2 and 3 of the sled.

The wings of this harrow may be lowered by removing a washer from the spring tension bolt, should the ridge being worked be very low or flat in the second cultivation.

In the use of this harrow each wing is held down by the bar 8 so that the weight of the driver holds the machine in the ground, but should either wing strike an obstacle the tension of the springs 35 and 36 will allow the wing to raise up and pass over without breaking. The tilting of the tooth bars provides for clearance of vines, stalks and the like and permits the machine to be used with either wet or dry earth without clogging.

I claim:

1. In a harrow, a sled, draw bars secured to the outer sides of the sled runners, tooth-carrying wings hinged to said draw bars and projecting from each side of said sled, means for tilting the teeth of said wings and locking them in adjusted position, and means for holding said wings down in operative position.

2. In a harrow, a sled, tooth-carrying wings hinged one on each side of said sled, means for tilting the teeth of said wings and locking them in adjusted position, and spring means for holding said wings down in operative position.

3. In a harrow, a sled, tooth-carrying wings hinged one on each side of said sled, means for tilting the teeth of said wings and locking them in adjusted position, means for holding said wings down in operative position, said means comprising a bar extending transversely of said sled and secured thereto, and yieldable means arranged between said bar and said wings to adapt the teeth to be held in the ground by the weight of the driver and yet permit them to yield on the striking of an obstruction.

4. In a harrow, a sled, tooth-carrying wings hinged one on each side of said sled, means for tilting the teeth of said wings and locking them in adjusted position, a bar secured to said sled and extending transversely thereof and having its ends arched and overhanging said wings, a spring connection between said wings and said bar ends, to adapt the wings to raise and lower for passage over an obstruction.

5. In a harrow, a sled, wings hinged one on each side of said sled, tooth-carrying crossbars mounted on said wings for tilting movement, a lever connected to tilt said tooth bars to vary the angle of the teeth, means for locking said lever in adjusted position, and means operable by the weight of the driver for holding the machine in the ground, said means being yieldable to permit the teeth to yield on striking an obstruction.

6. In a harrow, a sled, tooth-carrying wings hinged one on each side of said sled, said wings having swiveled crossbars with teeth mounted thereon, and a lever connected to operate said crossbars for tilting said teeth.

7. In a harrow, a sled, tooth-carrying wings hinged one on each side of said sled, obtuse-angled crossbars swiveled on said wings and provided with teeth, said bars being shaped to straddle the ridges to be worked, yieldable means for holding said tooth bars in operative position, and a lever connected to simultaneously tilt said tooth bars.

8. In a harrow, a sled, tooth-carrying wings hinged one on each side of said sled each including suitably supported swivelly mounted crossbars having teeth thereon, a cross-bar extending transversely of the sled and projecting beyond the sides thereof, upright rods mounted on said wings extending loosely through the ends of said crossbar, and springs on said rods to permit said wings to yield on the passage over an obstruction such springs being adjustable to permit the wings to be raised or lowered thereby.

In testimony whereof I have hereunto affixed my signature.

MILTON C. MYERS.